Aug. 30, 1960 E. GOLDSTEIN 2,951,229
ERROR-DETECTING AND CORRECTING SYSTEM
Filed April 27, 1959
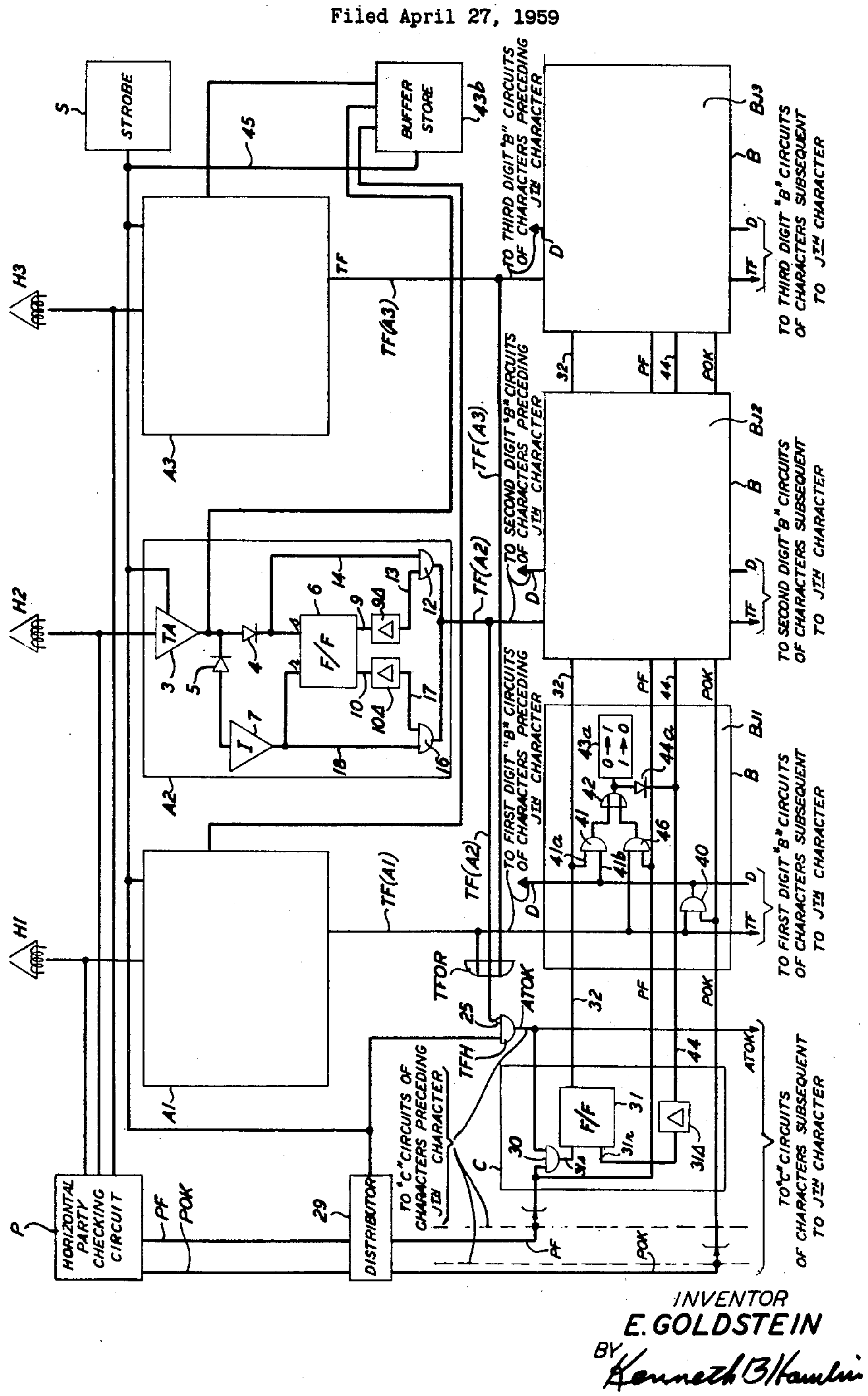
INVENTOR
E. GOLDSTEIN
BY Kenneth B. Hamlin
ATTORNEY 2,951,229

ERROR-DETECTING AND CORRECTING SYSTEM

Edward Goldstein, Summit, N.J., assignor to Bell Telephone Laboratories, Incorporated, New York, N.Y., a corporation of New York Filed Apr. 27, 1959, Ser. No. 809,264

18 Claims. (Cl. 340—147)

This invention relates to digital information processing and more particularly to the detection and correction of errors encountered therein.

A simple technique heretofore used for the detection of binary errors in a signal transmission is to encode the transmission in such manner that an odd (or even) or constant number of binary "1" digits are transmitted. This is accomplished by adding a parity check element to the information elements of the signal transmission. When an information digit from each of several independent sources is simultaneously transmitted together with a parity digit, a so-called "horizontal" parity check obtains. A "vertical" parity check obtains where a parity check digit is added to a sequence of information digits transmitted by a single information source. A deviation from the assigned parity convention, termed a parity failure, is indicative of the occurrence of an error.

Additionally, it is known that code combinations of digits may be selected so that a single error produces a combination which is not valid in the code, and furthermore, sufficient "space" may be left between valid combinations so that the occurrence of a single error will produce an invalid combination which is closer to the combination intended than it is to any other valid combination. The latter is an example of an error correcting code. In addition, error correction is obtainable by combining the results of the vertical and horizontal parity checks mentioned above. The term "error correcting" is used regardless of whether or not the system utilizing such checking features physically corrects the error, it being understood that correction is achieved when the correct value of a digital expression is ascertainable from the expression itself without the need of consulting with the generative source of the intended value of the digital information. Thus, where each character of a sequence of characters is composed of binary digits, an indication that the present value exhibited in a particular digit position of a particular character is wrong is tantamount to providing the correct value.

The error-checking characteristics of various systematic coding techniques, i.e., those utilizing information digits and check digits, may conveniently be evaluated in terms of a redundancy factor R. The redundancy R is defined as the ratio of the number of binary digits actually used to the minimum number necessary to convey the same information, that is, $R=n/m$, where $n$ is the total number of binary digits used in a code character and where $m$ is the number of digits associated with the information represented. The difference $n-m$ is the number of digits used for error detection and correction. The redundancy factor R also serves as a measure of the efficiency of the code as far as the information density of the transmission is concerned, being inversely related to information density. Further detailed descriptions of error detecting and correcting coding techniques may be found in numerous texts and articles, inter alia, "The Design of Switching Circuits" by Keister et al., published by D. Van Nostrand Co., pp. 275 et seq., as well as in Reissue Patent 23,601 of R. W. Hamming et al.

In modern high speed computing operations the storage of digital information may be accomplished by the use of any one of several magnetic recording techniques. Since the net result of reproducing information recorded on a magneitc tape is a product both of the characteristics of the recording code as well as the characteristics of the magnetic recording and reproducing techniques it is apparent that with a given recording code improved information transmission will result from the selection of efficient recording techniques as well as the maximum utilization of the characteristics exhibited by such techniques. The applicability of the above-mentioned redundancy factor R, previously defined in connection with particular codes employed in the representation of digital information may, accordingly, be extended to the calculation of the efficiency of the physical mode of signal transmission and more particularly to the specific recording techniques used. Thus, a magnetic recording technique for the conveyance of digital information which has a total of $n$ physical manifestations associated with the representation of the binary digit "1," for example, and which has only $m$ of these manifestations necessarily related to the information content (the abstract digital quantity "1") may similarly be said to have a redundancy R equal to $n/m$.

The governing factors underlying the choice of a particular one of these magnetic recording techniques relate primarily to the reliability of data representation and to the compactness of data storage, or information density. These conflicting considerations are in practice resolved by selecting a recording technique which affords an effective compromise between the extremes of maximum compactness (low R) and maximum reliability (high R). Thus, the so-called return to neutral or "RN" method of recording which utilizes pulses of distinct polarity to effect spots of corresponding remanent magnetization representing the binary "0" and "1" digits requires twice the number of magnetic cells per digit, and is accordingly less compact than the non-return-to-zero or "NRZ" recording methods, which utilize continuous rather than spot magnetization. (A magnetic cell being the minimum length of magnetic recording surface within which the remanent saturation states can be switched.) Of the "NRZ" methods, one uses a change in magnetic remanence whenever there is a change in the digit to be represented whereas the other "NRZ" method uses a change in magnetic remanence to represent a particular digit. This latter recording technique, to be hereinafter referred to as the modified or switched current "NRZ" recording method, is described, inter alia, in "Digital Computer Components and Circuits," by R. K. Richards, published by D. Van Nostrand Co., New York, at p. 330.

Among the physical manifestations of switched current "NRZ" recording which have heretofore been employed for the representation of information is the production of a transition in the remanent state of the magnetic tape to represent a binary digit. Because one of the binary values, usually "0," is represented in the switched current "NRZ" recording method by the absence of a signal the loss of a "1," either due to faulty recording or to faulty reading, has not heretofore been detectable unless one of the aforementioned coding schemes were employed to compensate for the lack of redundancy of the recording method. Hence, the use of switched current "NRZ" recording has heretofore involved either some degradation in the reliability or sacrifice in the compactness of data representation. As an alternative, it has heretofore been considered necessary either to rerun the magnetic record and compare the items of information obtained on successive trials or to provide additional parallel representations of the digital information in order to provide a sufficient basis of comparison for the detection of latent errors. The recovery and utilization of additional manifestations inherent in the recording method would provide an increase in effective R thereby making possible the detection or correction of errors without decreasing information density through the introduction of additional digits.

The employment of the aforementioned coding schemes has heretofore necessitated that a fairly low limit be placed on the number of characters which could be grouped into data blocks for entry in a buffer to enable horizontal and vertical parity checking to be effective in the detection and correction of errors. This limit was dictated by an estimate of the frequency of occurrence of multiple errors, the shorter data blocks providing more frequent parity checks which further reduced the density of data representation.

Accordingly, it is an object of the present invention to improve the efficiency and security of digital information processing.

It is another object of the present invention to provide an improved error detection and correction scheme with the use of less redundant data.

It is still another object of the present invention to improve the efficiency of utilization of conventional vertical parity checking digits.

It is a further object of the present invention to make data representation and transmission systems less susceptible to failure under multiple error conditions.

In the case of the present invention, in one specific illustrative embodiment thereof, it is proposed that certain physical manifestations of switched current "NRZ" recording be recovered during the reproduction of recorded information so, that the compactness of data storage exhibited by "NRZ" recording may be exploited without encountering any degradation in the security of the stored information.

In accordance with the principles of the present invention, in one aspect thereof, the pattern of alternations in the polarity of transition signals representing a particular binary value in corresponding digit positions of each character of a sequence of multidigit characters is correlated with an indication of character parity to determine the correct value of a character whose parity failure has been indicated.

It is a feature of the present invention that successive, particular value binary digits of an information sequence define vertical parity checking elements for the detection of errors in the sequence.

It is another feature of the present invention that the polarity of predetermined interlevel transition signals of a multilevel signal transmission be compared to locate a departure from the normal pattern of transition polarity variation.

It is another feature of this invention that a departure from a prescribed interdigital transition signal polarity pattern in any of a number of simultaneous signal transmissions be correlated with a horizontal parity check among transmissions to identify an erroneously transmitted signal.

The foregoing and other objects and features will be more readily understood from the following description when read with reference to the accompanying drawing, the single figure of which depicts in simplified schematic form an illustrative embodiment of the present invention.

Referring now to the drawing, apparatus is shown for obtaining signals representing multidigit characters from a switched current "NRZ" magnetic recording surface such as a magnetic tape and for detecting and correcting errors in such signals. In order to maintain the clarity of the drawing, circuitry has been shown which is suitable for use with a recording having three data tracks, the recording itself and the data tracks not being shown. The extension of the principles involved to recordings having more tracks will become apparent as hereinafter discussed.

The apparatus comprises three principal logic circuits which perform logic operations primarily on a per track, a per bit, and a per character basis. Circuit A is the transition signal polarity reversal monitoring circuit, one such circuit A being associated with a corresponding reading head H for each track of the magnetic recording; circuit B is the digit error circuit, there being one such circuit B for each bit in the data blocks into which the multidigit characters have been grouped on the magnetic recording. Circuit C is the parity-failure, character-identification circuit, there being one such circuit C required for each character of the magnetic recording within the data block.

In accordance with the switched current method of "NRZ" recording, the remanent state of the recording is caused to undergo a transition to the opposite remanent state whenever the binary digit "1" is recorded, and the priorly existing remanent state of the recording is unchanged whenever a binary "0" is recorded. It is, therefore, characteristic of a properly recorded digit sequence that the reading of successive binary "1" digits by any one of the heads H produces, in the head H, transition signals of alternate polarity.

The possible ways in which a single error can occur are shown in the following table:

*Table I*

0 is written, $1^+$ is read
0 is written, $1^-$ is read
$1^+$ is written, 0 is read
$1^-$ is written, 0 is read
$1^+$ is written, $1^-$ is read
$1^-$ is written, $1^+$ is read wherein the symbol "$1^+$" indicated that the digital value "1" is represented by a transition signal of positive polarity and wherein the symbol "$1^-$" indicates that the digital value "1" is represented by a transition signal of negative polarity. It will be seen that there are only six possible reading errors, the first four of which will also affect parity.

In a switched current "NRZ" magnetic recording of the data sequence 1111, for example, the polarity of transition signals may follow the sequence $1^+1^-1^+1^-$ or $1^-1^+1^-1^+$. Considering the first transition signal polarity sequence, an error in reading, say in the second digit position, can arise only by way of incorrectly reading the second digit as a "0" or as a "$1^+$." If read as a "$1^+$" the error is immediately evident because the polarity of transition signal in the second digit position is the same as the polarity of the transition signal in the first digit position whereas it is known that, the polarity of successive transitions must alternate. On the other hand, if the second digit is incorrectly read as a "0" the error is not immediately detectable but will become evident when the third digit is read because the polarity of the third digit transition signal will be the same as that of the first digit transition signal. In general, the successive occurrences of two binary "1" digits having the same polarity transition, regardless of the number of intervening "0's," is indicative of an error which will be picked up by the transition check. Thus, while the mistaken reading of a "$1^+$" as a "$1^-$," or vice versa, itself involves no degradation in the logic value of the information transmission, the detection of a "1" having incorrect transition signal polarity is of importance in the detection and correction of errors which do affect the accuracy of the transmission.

The following table summarizes the conditions leading to the detection and correction of errors in a sequence of multi-digit characters represented by signals from a switched current "NRZ" magnetic recording:

*Table 2*

| Case No. | Present Digit Representation | | 1+ was read last; parity (ok) | | See Notes |
|---|---|---|---|---|---|
| | Recorded | Read | Parity Check | Transition Check | |
| 1 | 0 | 1+ | fails | fails | (a) |
| 2 | 0 | 1− | fails | will fail | (b) |
| 3 | 1− | 0 | fails | will fail | (b) |
| 4 | 1− | 1+ | OK | fails | (c) |
| 5 | 1− | 1− | OK | OK | (c) |
| 6 | 0 | 0 | OK | OK | (c) |

Notes:
a Immediate correction.
b Correction made when next "1" occurs in track.
c Correction not necessary.

In Table 2 it has been assumed that there were no writing errors and that only a single reading error has occured. Writing errors may be divided into two classifications, logic errors and noise or interference errors. Logic errors, i.e., those in which a "1" is written for a "0," or vice versa, cannot upset the orderly alternation of transitions with the assumed method of recording. When the tape has been saturated in the negative direction no logic error can produce a negative transition. If a transition is produced where none was intended, it is automatically in the correct (expected) direction. Logic errors therefore produce parity check failures without transition check failures. This error can be detected but not corrected. Noise or interference errors, on the other hand, are those in which the transition from one remanent state to the other takes place improperly and such errors appear as if they were reading errors, and can be corrected provided that a "1" occurs in the track in which the error occurred before another error occurs anywhere in the data. Since for each correctable writing error there is a corresponding reading error (which cannot be distinguished at a single reading), the following discussion will, for the sake of uniformity treat all errors as reading errors and assume an error free recording.

Returning now to the drawing, each circuit A comprises a threshold amplifier 3 selectively gated by the strobe signal source S to apply signals sensed by head H to diodes 4 and 5. Strobe source S advantageously may utilize a "sprocket" channel signal recorded on a separate track of the some magnetic recording which bears the data tracks. Threshold amplifier 3, when activated by the strobe signal presents to diodes 4 and 5 one of three possible outputs: a positive pulse when the remanent magnetic state of the recording passing under head H undergoes a transition in one direction, a negative pulse when the remanent magnetic state of the recording undergoes a transition in the opposite direction, and no pulse when there is no transition in the remanent magnetic state of the recording passing under head H. A positive transition signal renders diode 4 conductive and the signal is coupled by diode 4 to the set input terminal of flip-flop 6 while a negative transition signal renders diode 5 conductive and is applied by diode 5 to inverter 7. The output of inverter 7 is applied to the reset terminal of flip-flop 6.

Assuming that during the interval when amplifier 3 is gated on by strobe signal source S there is obtained from the recording a positive transition signal (i.e., a transition of the remanent magnetic state of the recording which causes amplifier 3 to deliver a positive output pulse) the set output terminal 9 of flip-flop 6 will be energized. Delay element 9Δ couples the signal from terminal 9 to input lead 13 of AND gate 12 so that AND gate 12 will not be activated by the same pulse which sets flip-flop 6. However, the signal from terminal 9 reaches lead 13 in time for the next pulse from source S. Should the next transition signal sensed by head H be of positive polarity, indicating a departure from the above-mentioned characteristic of a properly recorded digit sequence, AND gate 12 will be activated by the energization of lead 14 as well as the energization of lead 13, the latter because of the culmination of the delay interval control by element 9Δ, thereby energizing the transition failure indicating lead TF. In similar manner AND gate 16 will be activated to energize lead TF by the successive occurrence of two negative transition signals since input lead 17 will be energized from terminal 10 via delay element 10Δ one delay interval after the occurrence of the first negative transition signal while input lead 18 will be energized by both first and second negative transition signals.

Each of the "A" circuit TF leads, viz. TF(A1), TF(A2), and TF(A3) is coupled to a corresponding input of OR gate TFOR so that the occurrence of a transition signal of improper polarity in any track, will cause the inhibit terminal 25 of inhibit gate TFH to be energized. Adaptation of the circuitry so far described to the case of magnetic recordings having more than three tracks is readily accomplished by providing an additional head H and circuit A for each track and by providing gate TFOR with a number of inputs equal to the number of "A" circuits employed. In accordance with the well-known operation of inhibit gates, the output lead ATOK of gate TFH will be energized by strobe source S only when terminal 25 is not energized, i.e., when all transition signals are of correct polarity.

A conventional parity checking circuit P is supplied with an input from each head H and energizes either the PF or POK output, accordingly, as the verification of character parity fails or succeeds. Parity may advantageously be verified either as to the total predetermined number of "1" digits per character or as to whether the number of "1" digits per character is even (or odd).

A distributor 29 is provided for sequentially coupling the POK and PF outputs of the parity checking circuit P to the corresponding input terminals of each parity-failure, character-identification circuit C in step with the succession of pulses applied to distributor 29 by strobe source S. Thus, as heads H1, H2 and H3 simultaneously read the first, second and third digits, respectively, of the *j*th character, the *j*th pulse of strobe S advances the PF and POK outputs of parity checking circuit P to the PF and POK inputs of the *j*th "C" circuit, viz., circuit C*j*. While only one such "C" circuit, viz., circuit C*j*, is completely shown in the drawing, a number of additional "C" circuits is indicated. The total number of "C" circuits is equal to the number of characters represented within the recording interval or data block of the magnetic recording being read by heads H. It is common practice where long runs of data are involved to group the information characters on the recording in discrete sequences, or data blocks which are identified at the beginning or at the end by one or more special characters, such as a character wherein all digits are "1's". Other special characters may also be used, for example, to index the data blocks or to provide a vertical parity check. Since a magnetic recording such as a tape may contain many data blocks, it is convenient and economical to use a number of "C" circuits equal to the number of characters in a data block and to reset distributor 29 after a number of pulses equal to the number of characters in the data block have been received from strobe source S.

The positions of the POK and PF output terminals of distributor 29 are shown during the *j*th pulse of strobe source S and, accordingly, are connected to the POK and PF inputs of the *j*th "C" circuit, C*j*, corresponding to the *j*th character in the data block.

Circuit C*j* is actuated by the simultaneous detection of a parity failure in the *j*th character (energization of the PF output of circuit P) and the absence of any transition signal polarity reversal failure among the simultaneously read digits of the *j*th character (energization of the ATOK output lead). The simultaneous energization of the PF and ATOK leads activates AND gate 30 to energize the set input terminal 31s of flip-flop 31 which in response thereto provides and maintains a signal on lead 32. The energization of leads PF and 32 provide to each of the three jth character digit error circuits Bj1, Bj2 and Bj3 an indication that an error exists in the jth character. It remains now to be determined in which bit of the three the error actually lies.

The array of digit error circuits B (of which array, circuit Bj1 is shown in detail) comprises means for indicating the precise location of the incorrect bit in response to combinations of signals obtained from lead 32, the transition failure TF leads of circuits A, the parity failure lead PF, the verified parity lead POK and the delayed transition polarity reversal failure lead D. While only the three "B" circuits for the jth character are shown, a number of "B" circuits (equal to the product of the number of characters in the data block and the number of digits per character) is indicated.

The "B" circuit array operates in the following manner. Consider cases 2 or 3 of Table 2. Upon the energization of lead 32 of the jth "C" circuit, Cj, indicating that a parity failure has occurred in the jth character, the 41a input lead of the delayed correction AND gate 41 will be energized in each of the jth character "B" circuits Bj1, Bj2 and Bj3. Identification of the incorrect bit is obtained when a transition failure is detected by one of the "A" circuits during the reading of a character subsequent to the jth character. This delayed transition failure occurring during the reading of a subsequent character, say the rth character, results in the activation of the AND gate 40 of the rth "B" circuit associated with the TF lead of the "A" circuit monitoring the recording track in which the delayed transition failure occurs. Assuming, for example, that circuit A1 detects a transition failure in the first digit of the rth character, the AND gate 40 of the leftmost, rth character "B" circuit will be energized. Activation of the leftmost, rth character "B" circuit AND gate 40 results in the energization of the leftmost D lead. The leftmost D lead is connected to the 41b input of each leftmost "B" circuit AND gate 41. Accordingly, AND gate 41 of the jth character "B" circuit has both its 41a and 41b inputs energized and AND gate 41 is activated. The output of AND gate 41 is coupled via OR gate 42 to utilization circuit 43a and to isolating impedance 44a. Utilization circuit 43a advantageously may comprise a lamp or other device for indicating the particular "B" circuit associated with the erroneous digit in the data block. Since binary digits are recorded in the data block the localization of the particular erroneous digit is tantamount to its correction. Equally advantageously, utilization circuit 43a may be associated with the buffer store 43b through conventional access circuitry, not shown, for changing the value of the corresponding digits of the data block entered in the store. Entry of data into store 43b is synchronized with strobe source S via lead 45.

Isolating impedance 44a is provided to couple the output of the energized OR gate 42 to lead 44 and to prevent the output of gate 42 from energizing any other than the one utilization circuit 43 to which it is immediately connected. Lead 44 is connected via delay element 31Δ to reset input 31r of flip-flop 31. Delay element 31Δ is provided with sufficient delay to prevent immediate reset of flip-flop 31 and so to stabilize its operation in accordance with well known flip-flop design procedure.

On the other hand, the operation of the "B" circuit array under the condition of simultaneous parity failure and transition signal polarity reversal failure, case 1 of Table 2, involves only the row of "B" circuits of the particular character containing the erroneous digit. Assuming that during the jth strobe pulse a parity failure is detected (PF output of circuit P energized) and that a transition signal reversal failure is detected by circuit A1 (lefthand TF lead energized) both inputs of the immediate correction AND gate 46 of the first digit "B" circuit Bj will be energized, thereby activating AND gate 46 whose output lead energizes OR gate 42. The output of OR gate 42 activates utilization circuit 43a.

Under the conditions which exist when a transition failure is detected by the digit monitoring "A" circuits but when there is no simultaneous or prior parity failure (case 4 of Table 2) none of the AND gates of any of the "B" circuits are activated and, consequently, utilization circuits 43a is not activated.

While the correlation between the detection of an error in character parity and the detection of an error in transition signal polarity reversal has been illustrated in terms of the above-described operation of the "B" and "C" circuits, numerous other embodiments for achieving such correlation may be devised by those skilled in the art.

It is to be understood that the above-described arrangements are illustrative of the application of the principles of the present invention. Numerous other arrangements may be devised by those skilled in the art without departing from the scope of the invention.

What is claimed is:

1. An error detecting and correcting system comprising a plurality of switched-current NRZ signal sources, first monitor means coupled to said sources for detecting a parity failure in a simultaneously presented signal group, second monitor means coupled to said sources for detecting a transition failure between sequentially presented signal groups, and means coupled to said first and said second means for correlating said parity and said transition failure to ascertain the correct value of said group.

2. An error detecting and correcting system in accordance with claim 1 wherein said means for correlating comprises indicating means, and coincidence means responsive to said parity and said transition failure for actuating said indicating means.

3. An error detecting and correcting system in accordance with claim 2 wherein said means for correlating includes a first and a second input terminal associated with said coincidence means, temporary storage means responsive to said parity failure for activating said first input terminal, and circuit means coupling said second monitor means and said second input terminal for actuating said coincidence means.

4. An error detecting and correcting system in accordance with claim 3 further comprising means for verifying the parity of signal groups subsequent to said group and wherein said circuit means is selectively actuated by said parity verifying means.

5. An error detecting and correcting system in accordance with claim 4 further comprising gate means coupled to said second monitor means and responsive to a transition failure for inhibiting the operation of said storage means, and means coupled to said indicating means for resetting said storage means.

6. Transition signal checking apparatus comprising bistable state switching means having a corresponding pair of input and output terminals associated with each said stable state, input means for selectively applying consecutive transition signals to said input terminals, coincidence means coupled to said switching means for comparing the state of said corresponding input and output terminals, and output means coupled to said coincidence means for indicating the existence of similar states at a corresponding pair of said input and output terminals.

7. Transition signal checking apparatus in accordance with claim 6 wherein said switching means further comprises means for delaying the switching of said output terminals until the termination of the signal applied at said input terminals.

8. Transition signal checking apparatus in accordance with claim 7 wherein said successive signals normally switch between a pair of signal levels in opposite directions, and wherein said input means includes gated amplifier means for applying said consecutive signals to alternate ones of said input terminals.

9. Transition signal checking apparatus in accordance with claim 8 further comprising strobe source means, gate means having an output periodically activated by said strobe source, and circuit means coupled to said output means for inhibiting said gate means.

10. Transition signal checking apparatus in accordance with claim 8 wherein said input means further comprises positively-poled diode means coupled between said amplifier and one of said input terminals, inverter means coupled to the other of said input terminals, and negatively-poled diode means interconnecting said amplifier and said inverter.

11. In a data processing system the combination comprising input means for presenting a sequence of switched-current NRZ multidigit characters, first monitor means coupled to said input means for detecting a parity failure in a character of said sequence, and second monitor means coupled to said input means for detecting a transition failure between successive digits of said sequence.

12. In a data processing system in accordance with claim 11 the combination wherein said second monitor means comprises means for detecting a transition failure between a digit of said character and one of said successive digits.

13. In a data processing system in accordance with claim 12 the combination wherein said second monitor means comprises means for detecting a transition failure between a digit of said character and a digit of a character preceding said character.

14. An error detecting and correcting system comprising a plurality of signal sources for reproducing sequences of multidigit characters, each of said sources normally alternating the polarity of consecutive signals of a particular value, the signals of each of said characters normally exhibiting a multidigit parity, transition signal verification means coupled to said sources for detecting an alternation failure between corresponding digit positions of a pair of said characters, parity checking means coupled to said input means for detecting a parity failure in a character of said sequence, and means responsive to said parity checking means and to said transition verification means for indicating said digit positions in said character.

15. A signal checking system comprising receiving means for transition signals representing a binary value, a row and column array of indicating circuits, a plurality of first monitor means coupled to said receiving means and responsive to the sense of successive ones of said signals for selectively activating one said column of error indicating circuits, and second monitor means coupled to said receiving means and responsive to the number of said signals simultaneously received thereat for selectively activating one said row of error indicating circuits.

16. A signal checking system in accordance with claim 15 wherein said first monitor means activates said column in response to successive signals of the same sense.

17. A signal checking system in accordance with claim 16 wherein said error indicating circuits include coincidence gate means activated by said first and said second monitor means.

18. A signal checking system in accordance with claim 16 further comprising AND gate means coupled to said second monitor means, and wherein said first monitor means activate said AND gate means in response to successive signals of opposite sense.

No references cited.